(12) United States Patent
Belenky et al.

(10) Patent No.: US 8,930,435 B2
(45) Date of Patent: Jan. 6, 2015

(54) EXPONENTIATION SYSTEM

(75) Inventors: Yaacov Belenky, Maaleh Adumim (IL); Zeev Geyzel, Alon Shvut (IL)

(73) Assignee: Cisco Technology Inc., San Jose, CA (US)

( * ) Notice: Subject to any disclaimer, the term of this patent is extended or adjusted under 35 U.S.C. 154(b) by 379 days.

(21) Appl. No.: 13/515,560

(22) PCT Filed: Sep. 21, 2010

(86) PCT No.: PCT/IB2010/054255
§ 371 (c)(1),
(2), (4) Date: Jun. 25, 2012

(87) PCT Pub. No.: WO2011/092552
PCT Pub. Date: Aug. 4, 2011

(65) Prior Publication Data
US 2012/0278375 A1    Nov. 1, 2012

(30) Foreign Application Priority Data
Jan. 28, 2010   (IL) .......................................... 203570

(51) Int. Cl.
*G06F 7/00*   (2006.01)
*G06F 7/72*   (2006.01)

(52) U.S. Cl.
CPC ................ *G06F 7/723* (2013.01); *G06F 7/725* (2013.01); *G06F 2207/7261* (2013.01); *G06F 2207/7271* (2013.01)
USPC .......................................... 708/603; 708/497

(58) Field of Classification Search
None
See application file for complete search history.

(56) References Cited

U.S. PATENT DOCUMENTS

| | | | | |
|---|---|---|---|---|
| 4,366,549 A * | 12/1982 | Katayama | ...................... | 708/625 |
| 5,289,397 A * | 2/1994 | Clark et al. | ................... | 708/491 |
| 5,452,241 A * | 9/1995 | Desrosiers et al. | ........... | 708/495 |
| 6,298,442 B1 * | 10/2001 | Kocher et al. | ................. | 713/194 |
| 2004/0167952 A1 * | 8/2004 | Gueron et al. | ................ | 708/492 |
| 2008/0130877 A1 | 6/2008 | Joye | | |

FOREIGN PATENT DOCUMENTS

| | | |
|---|---|---|
| EP | 2 128 754 A1 | 12/2009 |
| WO | WO 2006/067057 A1 | 6/2006 |
| WO | WO 2006/103341 A1 | 10/2006 |

OTHER PUBLICATIONS

Jun. 18, 2013 Office Communication in connection with prosecution of EP 13 167 629.8.
Dan Boneh et al., "On the Importance of Checking Cryptographic Protocols for Faults," (1997).

(Continued)

*Primary Examiner* — Michael D Yaary
(74) *Attorney, Agent, or Firm* — Husch Blackwell LLP

(57) ABSTRACT

A method for computation, including defining a sequence of n bits that encodes an exponent d, such that no more than a specified number of successive bits in the sequence are the same, initializing first and second registers using a value of a base x that is to be exponentiated, whereby the first and second registers hold respective first and second values, which are successively updated during the computation, successively, for each bit in the sequence computing a product of the first and second values, depending on whether the bit is one or zero, selecting one of the first and second registers, and storing the product in the selected one of the registers, whereby the first and second registers hold respective first and second final values upon completion of the sequence, and returning $x^d$ based on the first and second final values. Related apparatus and methods are also described.

16 Claims, 2 Drawing Sheets

(56) References Cited

OTHER PUBLICATIONS

Arnaud Boscher et al., "CRT RSA Algorithm Protected Against Fault Attacks," *Lecture Notes in Computer Science* (Springer Berlin Heidelberg, May 9, 2007, pp. 229-243).

A. Byrne et al., "Comparison of Simple Power Analysis Attack Resistant Algorithms for an Elliptic Curve Cryptosystem," *Journal of Computers*, vol. 2, No. 10, Dec. 2007 pp. 52-62 (Academy Publisher 2007).

A. Byrne et al., "SPA Resistant Elliptic Curve Cryptosystem Using Addition Chains," *Fourth International Conference on Information Technology*, pp. 995-1000 (IEEE 2007).

Benoit Chevallier-Mames et al., "Low Cost Solutions for Preventing Simple Side-Channel Analysis: Side Channel Atomicity," *IEEE Transactions on Computers*, vol. 53, No. 6, pp. 760-768 (IEEE Jun. 2004).

John H. Conway et al., "Lexicographic Codes: Error Correcting Codes From Game Theory," *IEEE Transactions on Information Theory*, vol. IT-32, No. 3, pp. 337-348 (IEEE May 1986).

Daniel M. Gordon et al., "A Survey of Fast Exponentiation Methods" (Center for Communications Research, Dec. 30, 1997).

Marc Joye et al., "Exponent Recoding and Regular Exponentiation Algorithms," *Africacrypt 2009*, pp. 334-349 (Springer-Verlag Berlin Heidelberg 2009).

Marc Joye, "Highly Regular m-ary Powering Ladders," *Selected Areas in Cryptography* (2009).

Marc Joye, "Highly Regular Right-To-Left Algorithms for Scalar Multiplication," *Cryptographic Hardware and Embedded Systems* (Vienna Sep. 2007).

Marc Joye et al., "The Montgomery Powering Ladder," *Cryptographic Hardware and Embedded Systems* (2002).

Marc Joye et al., "Optimal Left-To-Right Binary Signed-Digit Recoding," *IEEE Transactions on Computers*, vol. 49, No. 7, pp. 740-748 (IEEE Jul. 2000).

Marc Joye, "Recovering Lost Efficiency of Exponentiation Algorithms on Smart Cards," *Electronics Letters* 38(19): 1095-1097 (2002).

Oleg Maslennikow et al., "Hardware Realization of the Modular Exponentiation Operation in Cryptographic Systems Based on Binary and Multivalued Logic," $16^{th}$ *International Conference Mixed Design of Integrated Circuits and Systems*, pp. 271-275 (Department of Microelectronics & Computer Science, Technical University of Lodz, Jun. 2009).

James A. Muir, "A Simple Left-To-Right Algorithm for Minimal Weight Signed Radix-r Representations," *IEEE Transactions on Information Theory*, vol. 53, No. 3 pp. 1234-1241 (IEEE Mar. 2007).

Sung-Ming Yen et al., "Checking Before Output May Not Be Enough Against Fault-Based Cryptanalysis," *IEEE Transactions on Computers*, vol. 49, No. 9, pp. 967-970 (IEEE Sep. 2000).

\* cited by examiner

US 8,930,435 B2

EXPONENTIATION SYSTEM

RELATED APPLICATION INFORMATION

The present application is a 35 USC §371 application of PCT/IB/2010/054255, filed on 21 Sep. 2010 and entitled "Exponentiation System", which was published on 4 Aug 2011 in the English language with International Publication No. WO 2011/092552 and which relies for priority on Israel Patent Application 203570, filed 28 Jan. 2010.

FIELD OF THE INVENTION

The present invention relates generally to circuits and methods for secure and efficient computation, and specifically to computation of exponents.

BACKGROUND OF THE INVENTION

Exponentiation conventionally means raising a number x to a power d, i.e., calculation of $x^d$, which is equivalent to multiplying x by itself d−1 times. In this formula, x is referred to as the base, while d is the exponent. Modular exponentiation operations (i.e., calculation of $x^d$ mod N, wherein N is an integer called the modulus) in which d is a large integer (for example, 2048 bits long) are used in many cryptosystems, such Diffie-Hellmann secure key exchange, Rivest Shamir Adelman (RSA), ElGamal, and elliptic curve cryptography. A variety of exponentiation algorithms are known in the art, as described, for example, by Gordon in "A Survey of Fast Exponentiation Methods," *Journal of Algorithms* 27, pages 129-146 (1998).

In more generalized mathematical terms, however, exponentiation may be understood as applying any associative binary operation (not only multiplication) between a given base x and itself d−1 times. The base may be a scalar or it may be any other data structure in a set to which the associative operation applies. For example, in elliptic curve cryptography, the basic operation is called addition rather than multiplication. Exponentiation in elliptic curve cryptography is therefore regarded as summing a point on an elliptic curve over a finite field with itself d−1 times, but it is still implemented by the same sort of computation. Therefore, the term "product" should be understood in the context of the present patent application and in the claims in this more generalized sense, to mean the result of any associative binary operation of the sort described above (such as addition of points on an elliptic curve); and the term "exponentiation" and the equivalent notation $x^d$ should likewise be understood in this generalized sense.

Exponentiation operations have generally been implemented in integrated circuits (including those used in cryptography) as sequences of squaring and multiplication operations. A number of methods have been developed for breaking cryptographic schemes by monitoring an integrated circuit during the exponentiation operation in order to extract the private key that is used in the circuit. These attacks include, for example, power analysis and fault attacks.

In recent years, attack-resistant methods of exponentiation have been developed. Examples of such methods are described by Joye and co-authors in the following publications:

"The Montgomery Powering Ladder," *Cryptographic Hardware and Embedded Systems—CHES* 2002, published as vol. 2523 of *Lecture Notes in Computer Science*, pages 291-302 (Springer Verlag, 2003);

"Highly Regular m-ary Powering Ladders," *Selected Areas in Cryptography—SAC* 2009, published as vol. 5867 of *Lecture Notes in Computer Science*, pages 350-363 (Springer Verlag, 2009); and "Highly Regular Right-to-Left Algorithms for Scalar Multiplication," *Cryptographic Hardware and Embedded Systems—CHES* 2007, published a vol. 4727 of *Lecture Notes in Computer Science*, pages 135-147 (Springer Verlag, 2007).

As another example, Byrne et al. describe an attack-resistant method for point multiplication in elliptic curve cryptography in "SPA Resistant Elliptic Curve Cryptosystem Using Addition Chains," *Fourth International Conference on Information Technology—ITNG '07* (2007), pages 995-1000. The method uses Euclid's addition chains to represent the number k of point multiplications.

SUMMARY OF THE INVENTION

Embodiments of the present invention that are described hereinbelow provide methods and devices for exponentiation with enhanced efficiency and resistance to attack.

There is therefore provided, in accordance with an embodiment of the invention, a method for computation, including defining a sequence of n bits that encodes an exponent d. First and second registers are initialized using a value of a base x that is to be exponentiated, whereby the first and second registers hold respective first and second values, which are successively updated during the computation. Successively, for each bit in the sequence, a product of the first and second values is computed, and depending on whether the bit is one or zero, one of the first and second registers is selected. For each bit, the product is stored in the selected one of the registers, whereby the first and second registers hold respective first and second final values upon completion of the sequence. The result $x^d$ is returned based on the first and second final.

In a disclosed embodiment, initializing the first and second registers includes loading the value of the base into the first and second registers, and returning $x^d$ comprises computing the product of the first and second final values. Additionally or alternatively, defining the sequence of the bits includes choosing the bits in the sequence so that no more than a specified number of successive bits, such as two successive bits, are the same.

In some embodiments, computing the product includes, for each bit, setting an order of computation in which one of the first and second values is a first multiplicand, and the other of the first and second values is a second multiplicand, wherein the order varies over the sequence of the bits. Setting the order may include choosing the first or second value to be the first multiplicand depending on whether the bit is one or zero.

In some embodiments, the method includes performing an encryption operation or a decryption operation using the product of the first and second final values.

In a disclosed embodiment, defining the sequence of the bits includes setting the exponent d to be a sum of coprime integers a and b such that:

$$\frac{a}{b} = d_{k-1} + \cfrac{1}{d_{k-2} + \cfrac{1}{d_{k-3} + \cdots \cfrac{1}{d_0 + 1}}}$$

wherein the sequence of the bits consists of k alternating runs of identical bits, and for each i from 0 to k-1, $d_i$ is the number of the identical bits in the ith run.

There is also provided, in accordance with an embodiment of the invention, a method for computation, including defining an exponent d as a sequence of n bits having respective bit values. First, second and third registers are initialized to hold respective first, second and third values, which are to be updated during the computation, using a value of a base x that is to be exponentiated. Calculations are performed successively, for each bit in the exponent up to a final bit in the sequence. The calculations include selecting one of the first and second registers responsively to a bit value of the bit, and computing a product of the third value with a value that is stored in the selected one of the registers, and storing the product in the selected one of the registers, and computing a square of the third value and storing the square in the third register. After completing the calculations up to the final bit, a first result based on the first and second values is compared with a second result, typically based on the second and third values. If the first and second results are equal, $x^d$ is returned based on the calculations. An error indication is returned if the first and second results are not equal.

In a disclosed embodiment, the n bits of the exponent include a least significant bit $d_o$ and a most significant bit $d_{n-1}=1$, and the calculations are performed successively for each bit $d_i$ in the sequence from $d_o$ through $d_{n-2}$. Typically, the first and third registers are initialized to hold the base x, and the second register is initialized to hold 1, and selecting the one of the first and second registers includes, for each bit $d_i$, selecting the first register if $d_i=0$ and the second register if $d_i=1$, and comparing the first and second results includes computing the first result by multiplying the first value by the second value squared, and computing the second result by multiplying the second value by the third value, and returning $x^d$ includes outputting one of the first and the second results.

There is additionally provided, in accordance with an embodiment of the invention, apparatus for computation, including first and second registers, which are configured to hold respective first and second values, which are successively updated during the computation. A processor is configured to receive a sequence of n bits that encodes an exponent d, to initialize the first and second registers using a value of a base x that is to be exponentiated, and successively, for each bit in the sequence to compute a product of the first and second values, to select one of the first and second registers depending on whether the bit is one or zero, and to store the product in the selected one of the registers, whereby the first and second registers hold respective first and second final values upon completion of the sequence. The processor is configured to return $x^d$ based on the first and second final values.

There is further provided, in accordance with an embodiment of the invention, apparatus for computation, including first, second and third registers, which are configured to hold respective first, second and third values, which are to be updated during the computation. A processor is configured to receive an exponent d as a sequence of n bits having respective bit values, to initialize the first, second and third registers using a value of a base x that is to be exponentiated, and to perform calculations successively, for each bit in the exponent up to a final bit in the sequence, the calculations including selecting one of the first and second registers responsively to a bit value of the bit, computing a product of the third value with a value that is stored in the selected one of the registers, and storing the product in the selected one of the registers, and computing a square of the third value and storing the square in the third register. The processor is configured, after completing the calculations up to the final bit, to compare a first result based on the first and second values and a second result based on the third value, and to return $x^d$ based on the calculations if the first and second results are equal, or to return an error indication if the first and second results are not equal.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

System Description and Overview

Figure 1:
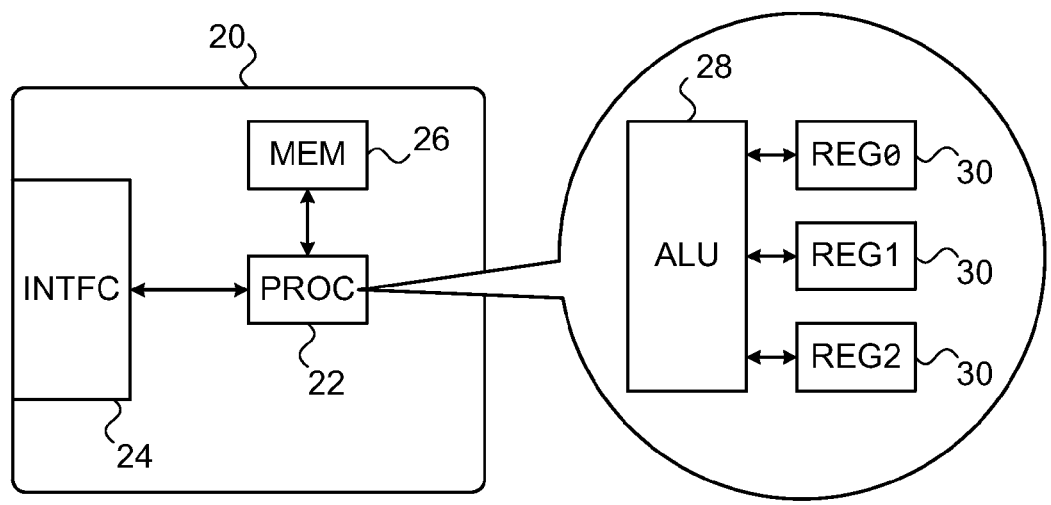
FIG. 1 is a block diagram that schematically illustrates an exponentiation system, in accordance with an embodiment of the invention.

FIG. 1 is a block diagram that schematically illustrates an exponentiation system 20, in accordance with an embodiment of the invention. In the present example, it will be assumed that system 20 comprises an encryption or authentication device, which performs exponentiation as part of an encryption and/or decryption process. For instance, system 20 may comprise an integrated circuit that is embedded in a smart card or in a communication device for the purpose of authenticating the holder of the card or device and/or for encrypting outgoing messages or decrypting incoming content. Alternatively, the exponentiation circuits and methods that are described hereinbelow may be used in substantially any other application that requires secure exponentiation.

System 20 comprises an embedded processor 22, which receives and transmits data via an interface 24. A memory 26 comprises non-volatile memory, such as read-only memory (ROM) or flash memory, which holds a private key. The memory may also comprise volatile random access memory (RAM) for holding calculation results and other data. Processor 22 may be a software- or firmware-driven microprocessor, or it may simply comprise hardware logic circuits, depending on application requirements. System 20 typically comprises other components, not shown in the figure, such as power circuits and application-specific peripheral devices, but they are omitted here for the sake of simplicity.

For purposes of exponentiation (and possible other functions, as well), processor 22 comprises an arithmetic logic unit (ALU) 28 and a number of registers 30. The ALU receives values of a base x and an exponent d and computes the exponentiated value $x^d$, using one or more of the methods that are described hereinbelow. Typically (although not necessarily), the base x comprises data that are to be encrypted or decrypted, which are read by processor 22 from interface 24 or memory 26. The exponent d is the private key stored in memory 26, or d is derived from the private key. In RSA cryptography, the private key is derived from a certain pair of prime numbers, whereas in other encryption schemes the private key may generally be chosen at random. For secure encryption, d is generally a large number, such as a 2048-bit binary number.

Memory 26 is designed to hold the private key securely, in a way that prevents attackers from reading out the private key directly. (Memory designs that provide such secure storage are known in the art and are beyond the scope of the present patent application.) Therefore, attackers typically attempt to extract the private key by externally observing the operation of system 20 during encryption or decryption. A variety of techniques, known as "attacks," have been developed for this purpose.

For example, in comparative power analysis attacks, the attacker measures the instantaneous power consumption of the system during exponentiation. Such attacks were first described by Homma et al., in "Collision-Based Power Analysis of Modular Exponentiation Using Chosen-Message Pairs," *Proceedings of the 10th international workshop on Cryptographic Hardware and Embedded Systems CHES 2008*, published as vol. 5154 of *Lecture Notes in Computer Science*, pages 15-29 (Springer Verlag, 2008). Attacks of this sort are based on the observation that it is possible to distinguish, based on power consumption, between a pair of identical multiplications and a pair of different multiplications. They can be used particularly to extract exponents from devices that implement algorithms that include squaring operations irregularly interleaved with other multiplications or in which the values that are squared depend on the exponent. In many known algorithms either the sequence of multiplication and squaring operations or the values being squared or both are determined by the sequence of bits in the exponent. By observing the power consumption sequence, the attacker is thus able to extract the bits of the exponent. To foil this type of attack, it is desirable either that the exponentiation method be regular, i.e., use the same sequence of multiplication and squaring operations and square the same values regardless of the exponent, or that the method avoid squaring operations altogether.

In fault attacks, the attacker induces the system to exponentiate the same base multiple times, while introducing faults (such as a momentary over-voltage) in the system at one or more points in the process. By observing the changes in the system output due to faults, the attacker is again able to extract the sequence of bits in the exponent. To foil the most common types of fault attacks, known as "safe error" attacks, of the order of the operands in successive operations carried out by the system can be varied in such a way that the faults will cause inconsistent results (as is explained further hereinbelow). Additionally or alternatively, the system may defend against all sorts of fault attacks by detecting faults and then avoiding output of erroneous, fault-induced results.

The embodiments of the present invention that are described hereinbelow provide methods of exponentiation for implementation in hardware logic that are resistant to both power and fault attacks. At the same time, these methods are computationally efficient, i.e., they require a relatively small number of computations (multiplication or squaring) per bit of the exponent, close to the average 1.5 operations/bit for traditional square-and-multiply algorithms. For convenience and clarity, these methods are described hereinbelow with reference to system 20 (FIG. 1), but they may similarly be implemented in substantially any other suitable hardware configuration, including implementations in software or firmware on a programmable processor.

Furthermore, the methods described below may also be used, mutatis mutandis, in performing other sorts of exponentiation operations, in the broad sense of "exponentiation" that is defined in the Background section above. For this reason, the conventional terms "multiplication" and "squaring" that are used below should be understood to include within their scope "addition" and "addition with self" in the context of elliptical curve cryptography, and the equivalent associative operations that may be performed in other algebras.

Exponentiation Without Squaring

Figure 2:
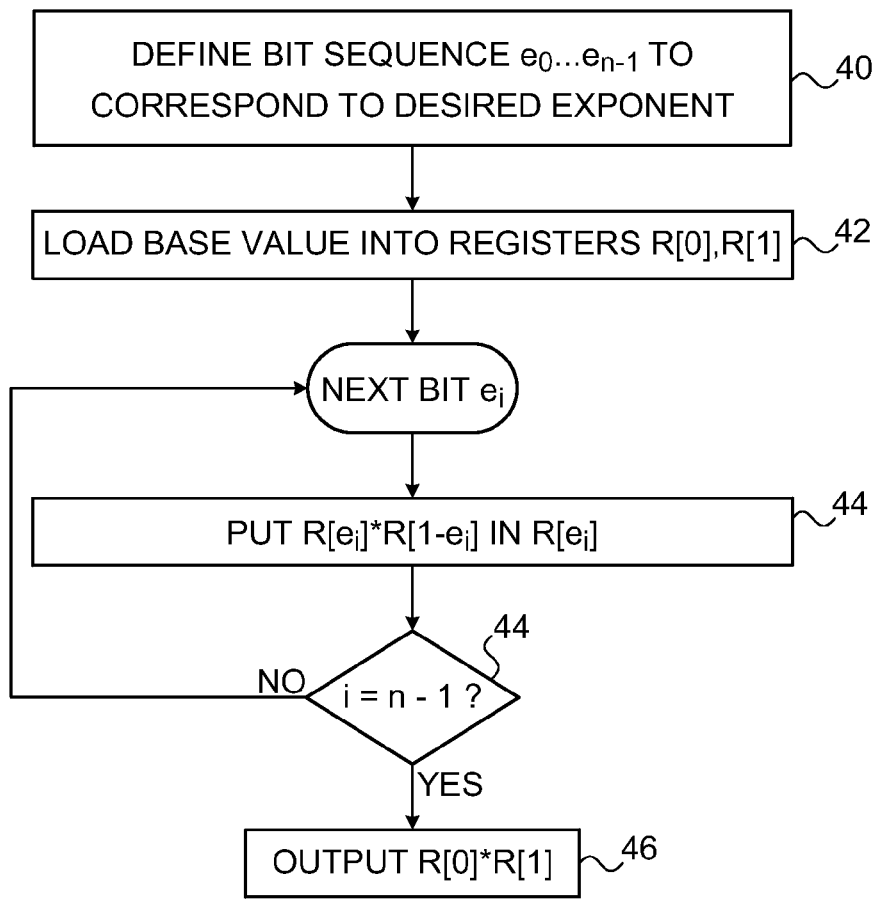
FIG. 2 is a flow chart that schematically illustrates a method for exponentiation, in accordance with an embodiment of the invention.

FIG. 2 is a flow chart that schematically illustrates a method for exponentiation, in accordance with an embodiment of the invention. In this method, the exponent d is itself encoded by a sequence of n bits, $e_0 e_1 \ldots e_{n-1}$. This bit sequence is selected, at random or based on any other desired criterion, in a bit sequence definition step 40. The bit sequence $e_0 e_1 \ldots e_{n-1}$ consists of k alternating runs of identical bits, and for each i from 0 to k-1, $d_i$ is defined as the number of the identical bits in the ith run. In other words, assuming $e_0=1$, the bit sequence $e_0 e_1 \ldots e_{n-1}$ begins with $d_0$ ones, followed by $d_1$ zeroes, followed by $d_2$ ones, and so forth. (The same representation would be valid if $e_0=0$.) For computational efficiency, it may be preferable to limit the lengths of the runs in $e_0 e_1 \ldots e_{n-1}$ to one or two consecutive bits, so that each $d_i=1$ or 2.

The exponent d that is encoded by a given bit sequence $e_0 e_1 \ldots e_{n-1}$, when this bit sequence is used in the exponentiation method of FIG. 2, is a sum of coprime integers a and b such that:

$$\frac{a}{b} = d_{k-1} + \cfrac{1}{d_{k-2} + \cfrac{1}{d_{k-3} + \ldots \cfrac{1}{d_0 + 1}}} \qquad \text{[equation 1]}$$

Alternatively, given a chosen exponent d, the values $d_0 \ldots d_{k-1}$ may be derived by choosing an arbitrary representation of d as a sum of two integers a and b and then performing the calculation shown in the above formula. For most exponentiation-based encryption methods, the exponent can be chosen at random, and the above technique can thus be used to derive the exponent by starting from a random (or pseudo-random) bit sequence $e_0 e_1 \ldots e_{n-1}$.

The method of FIG. 2 uses two registers 30, referred to as R[0] and R[1], to store interim values of the computation. ALU 28 initializes the computation by loading the value of the base x that is to be exponentiated into the registers, at an initialization step 42. For each bit in the sequence $e_i$, beginning from $e_0$ and continuing to $e_{n-1}$, ALU 28 then selects one of the two registers, computes the product of the current values in the registers R[0]*R[1], and stores the product in the selected one of the registers, at a multiplication step 44. The ALU selects the register to receive the product at step 44 depending on whether the current bit $e_i$ is one or zero (so that, for example, the product is stored in R[0] if $e_i=0$ and in R[1] if $e_i=1$).

Upon completion of the bit sequence at $e_{n-1}$, the registers hold respective final values. The product of these final values is equal to $x^d$. ALU 28 computes and returns this product at an output step 46.

The above method thus returns the value of the desired exponent with no squaring operations at all (except for the product x*x in the first iteration of step 44). The average computational cost of the method is approximately 1.54 multiplications per bit of the exponent, which is only slightly higher than the baseline of 1.5. The absence of squaring operations makes the method resistant to power attacks, and particularly comparative power analysis.

Various criteria may be used at step 44 to choose the order of the multiplicands to use in computing R[0]*R[1]. At the simplest level, ALU 28 could always choose the same register as the first multiplicand. This implementation, however, would be vulnerable to some types of fault attacks, such as "safe error" attacks, as described by Yen et al., in "Checking Before Output May Not Be Enough Against Fault-Based Cryptanalysis," *IEEE Transactions on Computers* 49:9, pages 967-970 (September 2000). The reason for this vulnerability is that in a typical ALU, multiplication of two large multiplicands is performed as a series of multiply and add operations over subsequences of the bits in the each of the multiplicands. The series loops over all pairs of subsequences in a dual loop, with one of the multiplicands (for instance, the second multiplicand) in the inner loop and the other in the outer loop. Keeping the same multiplicand order over all iterations through step 44 introduces a consistency of calculation that can be used in a safe error attack to infer the values of $e_0 e_1 \ldots e_{n-1}$.

To avoid this vulnerability, ALU 28 selects, for each bit $e_i$, an order of computation in which the value of the first multiplicand is taken from one of the registers R[0] and R[1], and the value of the second multiplicand is taken from the other register, wherein the order varies over the sequence of the bits $e_0 e_1 \ldots e_{n-1}$. In the implementation shown in FIG. 2, the value in either the first or the second register is chosen to be the first multiplicand depending on whether the bit $e_i$ is one or zero. Thus, the method of FIG. 2 may be written simply in pseudocode form as:

```
R[0]=R[1]=x
for i=0... n-1:
    R[e_i]=R[e_i]*R[1-e_i]
return R[0]*R[1]
```

Alternatively, further variation may be introduced into the order of the multiplicands, so that for certain values of i (such as even values, or values divisible by some other factor, or chosen by some other criterion), $R[e_i]=R[e_i]*R[1-e_i]$, and for all other values, $R[e_i]=R[1-e_i]*R[e_i]$. This additional variation may provide additional resistance to attacks.

Regular Exponentiation Method with Protection Against Fault Attacks

Although the method described above is resistant to both power attacks and safe error attacks, it requires the exponent to be defined in a certain way. Some cryptosystems, however, such as RSA, impose their own limitations on the choice of the exponent, which may be incompatible with the above requirements. In particular, if a private exponent is predefined, as in RSA, it may be difficult to produce a sequence $d_0 d_1 \ldots d_{k-1}$ representing the exponent, as defined above, in which all $d_i=1$ or 2 (or at least are limited by a specified small number). Representations that include larger values of $d_i$ can be used but are inefficient.

Figure 3:
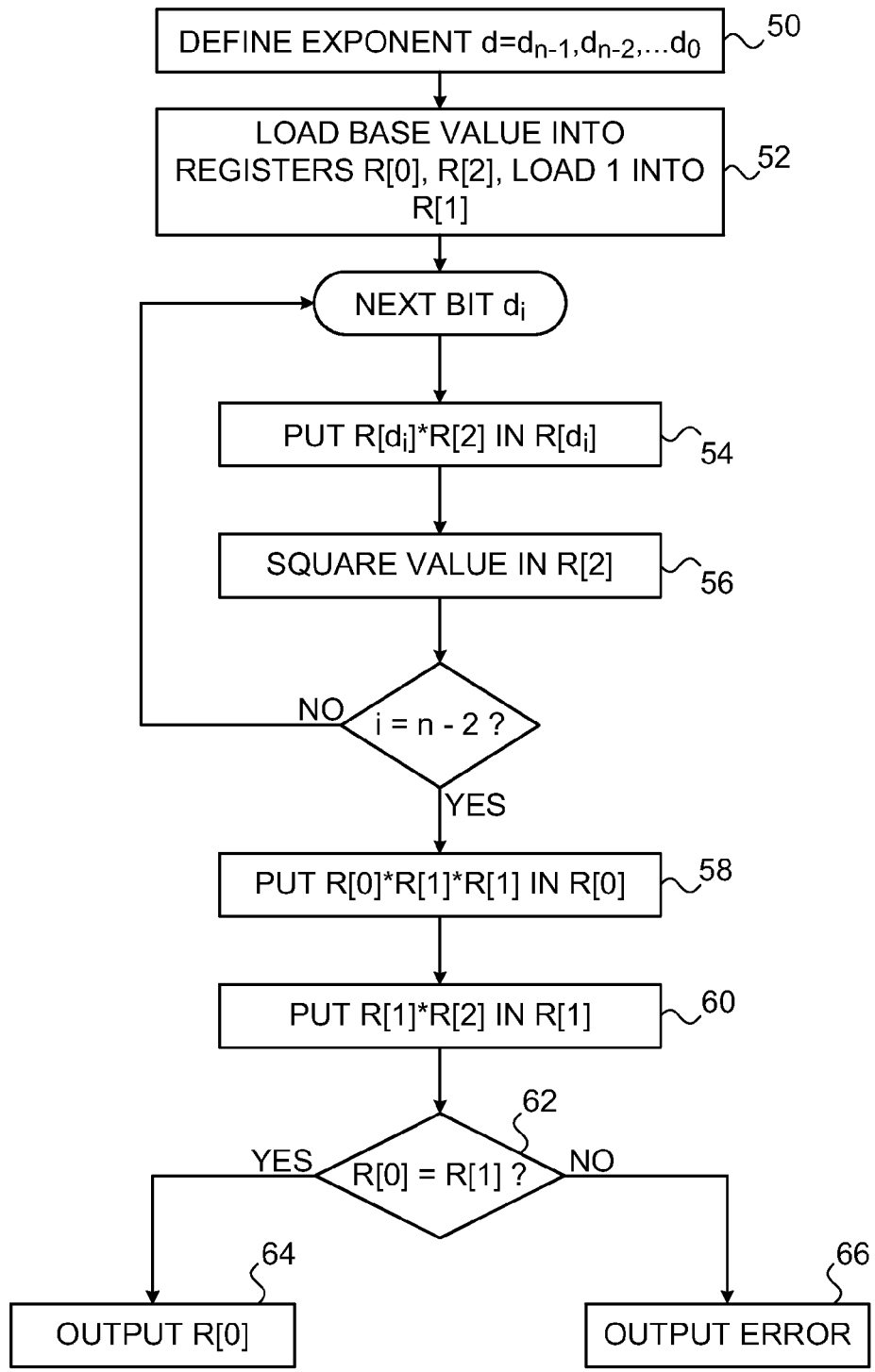
FIG. 3 is a flow chart that schematically illustrates a method for exponentiation, in accordance with another embodiment of the invention.

FIG. 3 is a flow chart that schematically illustrates a method for exponentiation, in accordance with an alternative embodiment of the invention, in which any desired exponent may be used. This method has the advantage of high regularity, in that one multiplication and one squaring operation are performed for every bit of the exponent, regardless of the value of the bit, and the values being squared do not depend on the exponent. This regularity makes the method resistant to power attacks, and particularly to comparative power analysis. In addition, the method includes a built-in check, which prevents any result from being returned when a fault has occurred in the computation, and thus provides resistance against fault attacks. The computational cost of this method—approximately two computations per bit of the exponent—is no greater than that of other regular exponentiation methods that are known in the art.

The exponent d is defined, at an exponent definition step 50, as a sequence of n bits having respective bit values $d_{n-1} d_{n-2} \ldots d_0$ in binary representation. The most significant bit $d_{n-1}$ has the value 1 by definition. The method of FIG. 3 uses three registers 30, which are referred to hereinbelow as R[0], R[1] and R[2], to hold respective values that are updated during the computation. At least one of the registers is loaded initially with the value of the base x, at a register loading step 52. In the present implementation, x is loaded initially into R[0] and R[2], while R[1] is loaded with the value 1.

For each of the bits $d_i$ in d, up to (but not including) the final bit, ALU 28 performs the following computations:

the ALU selects either R[0] or R[1], depending on the value of $d_i$ (i.e., it selects $R[d_i]$), computes the product of the value in R[2] with the value in the selected register, and stores the product in the selected register, at a multiplication step 54; and the ALU then computes the square of the value in R[2] and stores the result in R[2], at a squaring step 56.

In a right-to-left implementation, steps 54 and 56 are repeated iteratively from the least significant bit $d_0$ up to $d_{n-2}$. If no fault occurs in the computation, the relation R[2]=R[1]*R[0] will hold after each iteration. A fault during either step 54 or step 56 will likely destroy this relation.

After completing the above calculations, ALU 28 computes two results:

a first result based on the values in R[0] and R[1], at a first result computation step 58. In the implementation shown in FIG. 3, the ALU computes R[0]*R[1]*R[1], which will be equal to $x^d$ if no fault has occurred during the preceding steps, and stores this result in R[0]; and a second result based on the value in R[2], at a second result computation step 60. In the implementation of FIG. 3, the ALU computes R[1]*R[2], which will also be equal to $x^d$ if no fault has occurred during the preceding steps, and stores this result in another register, say R[1].

As noted above, however, if a fault has occurred (or has been induced), the values computed in steps 58 and 60 will no longer be equal to $x^d$ or to one another.

ALU 28 compares the results of steps 58 and 60, at a result comparison step 62. In the implementation shown in FIG. 3, the ALU compares the values stored in R[0] and R[1]. (Alternatively, the ALU may compare other values, such as comparing R[2] to the product R[0]*R[1] before completing the computation of $x^d$ at step 58 and/or 60.) If the compared values are equal, the ALU concludes that no fault has occurred during the computation and returns $x^d$, at an output step 64. In this case, the ALU may output either the computed value of R[0]*R[1]*R[1] from R[0] or the computed value of R[1]*R[2] from R[1]. On the other hand, if the compared values are not equal, the ALU concludes that a fault has occurred and returns an error indication, such as a null output, at an error output step 66. Thus, in the case of a fault attack, the attacker does not receive any numerical result that can be used in extracting the value of the exponent.

The method of FIG. 3 may be written in pseudocode form as follows:

```
R[2]=R[0]=x
R[1]=1
for i=0... n-2
    R[d_i]*=R[2]
    R[2]*=R[2]
R[0]*=R[1]
R[0]*=R[1]
R[1]*=R[2]
if R[0]<>R[1]
    return error
else
    return R[0]
```

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

It will be appreciated by persons skilled in the art that the present invention is not limited by what has been particularly shown and described hereinabove. Rather the scope of the invention is defined by the appended claims and equivalents thereof.

What is claimed is:

1. A method for computation comprising, performing with a processor:
   defining a sequence of n bits, such that no more than a specified number of successive bits in the sequence are the same wherein the sequence of the bits consists of k alternating runs of identical bits, and for each i from 0 to k-1, $d_i$ is the number of the identical bits in the ith run; then
   determining coprime integers a and b using the following equation:

$$\frac{a}{b} = d_{k-1} + \cfrac{1}{d_{k-2} + \cfrac{1}{d_{k-3} + \cdots \cfrac{1}{d_0 + 1}}};$$

and then
setting an exponent d to be a sum of the coprime integers a and b;
initializing first and second registers using a value of a base x that is to be exponentiated, whereby the first and second registers hold respective first and second values, which are successively updated during the computation;
successively, for each bit in the sequence:
   computing a product of the first and second values;
   depending on whether the bit is one or zero, selecting one of the first and second registers; and
   storing the product in the selected one of the registers,
whereby the first and second registers hold respective first and second final values upon completion of the sequence; and
returning $x^d$ based on the first and second final values.

2. The method according to claim 1, wherein initializing the first and second registers comprises loading the value of the base into the first and second registers, and wherein returning $x^d$ comprises computing the product of the first and second final values.

3. The method according to claim 1, wherein the specified number is two.

4. The method according to claim 1, further comprising performing an encryption operation or a decryption operation using the product of the first and second final values.

5. A method for computation comprising, performing with a processor:
   defining an exponent d as a sequence of n bits having respective bit values;
   initializing first, second and third registers to hold respective first, second and third values, which are to be updated during the computation, using a value of a base x that is to be exponentiated; and
   performing calculations successively, for each bit in the exponent up to a final bit in the sequence, the calculations comprising:
      selecting one of the first and second registers responsively to a bit value of the bit;
      computing a product of the third value with a value that is stored in the selected one of the registers, and storing the product in the selected one of the registers; and
      computing a square of the third value and storing the square in the third register;
   after completing the calculations up to the final bit, comparing a first result based on the first and second values and a second result based on the third value; and
   if the first and second results are equal, returning $x^d$ based on the calculations, and returning an error indication if the first and second results are not equal
wherein the n bits of the exponent comprise a least significant bit $d_0$ and a most significant bit $d_{n-1}=1$, and wherein the calculations are performed successively for each bit $d_i$ in the sequence from $d_0$ through $d_{n-2}$.

6. The method according to claim 5, wherein:
   the first and third registers are initialized to hold the base x, and the second register is initialized to hold 1;
   selecting the one of the first and second registers comprises, for each bit $d_i$, selecting the first register if $d_i=0$ and the second register if $d_i=1$;
   comparing the first and second results comprises computing the first result by multiplying the first value by the second value squared, and computing the second result by multiplying the second value by the third value; and
   returning $x^d$ comprises outputting one of the first and the second results.

7. The method according to claim 5, and comprising performing an encryption operation or a decryption operation using the first result.

8. Apparatus for computation, comprising: first and second registers, which are configured to hold respective first and second values, which are successively updated during the computation; and a processor, which is configured to:
define a sequence of n bits, such that no more than a specified number of successive bits in the sequence are the same wherein the sequence of the bits consists of k alternating runs of identical bits, and for each i from 0 to k-1, $d_i$ is the number of the identical bits in the ith run; then
determine coprime integers a and b using the following equation:

$$\frac{a}{b} = d_{k-1} + \cfrac{1}{d_{k-2} + \cfrac{1}{d_{k-3} + \cdots \cfrac{1}{d_0 + 1}}};$$

and then
set an exponent d to be a sum of the coprime integers a and b;
initialize the first and second registers using a value of a base x that is to be exponentiated; and
successively, for each bit in the sequence:
compute a product of the first and second values;
select one of the first and second registers depending on whether the bit is one or zero; and
store the product in the selected one of the registers, whereby the first and second registers hold respective first and second final values upon completion of the sequence, and
wherein the processor is configured to return $x^d$ based on the first and second final values.

9. The apparatus according to claim 8, wherein the processor is configured to initialize the first and second registers by loading the value of the base into the first and second registers, and to return the product of the first and second final values as $x^d$.

10. The apparatus according to claim 8, wherein the specified number is two.

11. The apparatus according to claim 8, wherein the processor is configured to perform an encryption operation or a decryption operation using the product of the first and second final values.

12. Apparatus for computation, comprising:
first, second and third registers, which are configured to hold respective first, second and third values, which are to be updated during the computation; and
a processor, which is configured to receive an exponent d as a sequence of n bits having respective bit values, to initialize the first, second and third registers using a value of a base x that is to be exponentiated, and to perform calculations successively, for each bit in the exponent up to a final bit in the sequence, the calculations comprising:
selecting one of the first and second registers responsively to a bit value of the bit;
computing a product of the third value with a value that is stored in the selected one of the registers, and storing the product in the selected one of the registers; and
computing a square of the third value and storing the square in the third register,
wherein: the processor is configured, after completing the calculations up to the final bit, to compare a first result based on the first and second values and a second result based on the third value, and to return $x^d$ based on the calculations if the first and second results are equal, or to return an error indication if the first and second results are not equal; the n bits of the exponent comprise a least significant bit $d_0$ and a most significant bit $d_{n-1}=1$; and the processor is configured to perform the calculations successively for each bit $d_i$ in the sequence from $d_0$ through $d_{n-2}$.

13. The apparatus according to claim 12, wherein:
the first and third registers are initialized to hold the base x, and the second register is initialized to hold 1;
selecting the one of the first and second registers comprises, for each bit $d_i$, selecting the first register if $d_i=0$ and the second register if $d_i=1$; and
the processor is configured to compute the first result by multiplying the first value by the second value squared, and to compute the second result by multiplying the second value by the third value, and to output one of the first and the second results as $x^d$.

14. The apparatus according to claim 12, wherein the processor is configured to perform an encryption operation or a decryption operation using the first result.

15. A method for computation, comprising, performing with a processor:
defining an exponent d as a sequence of n bits having respective bit values;
initializing first, second and third registers to hold respective first, second and third values, which are to be updated during the computation, using a value of a base x that is to be exponentiated; and
performing calculations successively, for each bit in the exponent up to a final bit in the sequence, the calculations comprising:
selecting one of the first and second registers responsively to a bit value of the bit;
computing a product of the third value with a value that is stored in the selected one of the registers, and storing the product in the selected one of the registers; and
computing a square of the third value and storing the square in the third register;
after completing the calculations up to the final bit, comparing a first result based on the first and second values and a second result based on the third value; and
if the first and second results are equal, returning $x^d$ based on the calculations, and returning an error indication if the first and second results are not equal, and wherein:
the first and third registers are initialized to hold the base x, and the second register is initialized to hold 1;
selecting the one of the first and second registers comprises, for each bit $d_i$, selecting the first register if $d_i=0$ and the second register if $d_i=1$;
comparing the first and second results comprises computing the first result by multiplying the first value by the second value squared, and computing the second result by multiplying the second value by the third value; and
returning $x^d$ comprises outputting one of the first and the second results.

16. Apparatus for computation, comprising:
first, second and third registers, which are configured to hold respective first, second and third values, which are to be updated during the computation; and
a processor, which is configured to receive an exponent d as a sequence of n bits having respective bit values, to initialize the first, second and third registers using a value of a base x that is to be exponentiated, and to perform calculations successively, for each bit in the exponent up to a final bit in the sequence, the calculations comprising:
  selecting one of the first and second registers responsively to a bit value of the bit;
  computing a product of the third value with a value that is stored in the selected one of the registers, and storing the product in the selected one of the registers; and
  computing a square of the third value and storing the square in the third register,
wherein: the processor is configured, after completing the calculations up to the final bit, to compare a first result based on the first and second values and a second result based on the third value, and to return $x^d$ based on the calculations if the first and second results are equal, or to return an error indication if the first and second results are not equal; the first and third registers are initialized to hold the base x, and the second register is initialized to hold 1; selecting the one of the first and second registers comprises, for each bit $d_i$, selecting the first register if $d_i=0$ and the second register if $d_i=1$; and the processor is configured to compute the first result by multiplying the first value by the second value squared, and to compute the second result by multiplying the second value by the third value, and to output one of the first and the second results as $x^d$.

* * * * *

UNITED STATES PATENT AND TRADEMARK OFFICE
CERTIFICATE OF CORRECTION

| | | |
|---|---|---|
| PATENT NO. | : 8,930,435 B2 | Page 1 of 1 |
| APPLICATION NO. | : 13/515560 | |
| DATED | : January 6, 2015 | |
| INVENTOR(S) | : Belenky et al. | |

It is certified that error appears in the above-identified patent and that said Letters Patent is hereby corrected as shown below:

IN THE CLAIMS:

In column 13, line 2 (tenth line of claim 16), delete "fmal" and substitute therefor --final--.

Signed and Sealed this
Thirty-first Day of March, 2015

Michelle K. Lee
*Director of the United States Patent and Trademark Office*